| United States Patent [19] | [11] 3,835,177 |
| Bach | [45] Sept. 10, 1974 |

[54] PROCESS FOR THE PREPARATION OF BENZONITRILE

[75] Inventor: Hartwig C. Bach, Pensacola, Fla.

[73] Assignee: Monsanto Company, St. Louis, Mo.

[22] Filed: Oct. 12, 1972

[21] Appl. No.: 297,106

Related U.S. Application Data

[62] Division of Ser. No. 92,165, Nov. 23, 1970, Pat. No. 3,719,701.

[52] U.S. Cl............................................. 260/465 R
[51] Int. Cl.......................................... C07c 121/02
[58] Field of Search ................................. 260/465 R

[56] References Cited
UNITED STATES PATENTS
2,375,016  5/1945  Marple et al. ............... 260/465.9 X
2,849,478  8/1958  Zerbay et al................. 260/465.9 X

*Primary Examiner*—Elbert L. Roberts
*Assistant Examiner*—Dolph H. Torrence
*Attorney, Agent, or Firm*—John W. Whisler

[57] ABSTRACT

Benzonitrile is prepared by the catalytic oxidation of benzylamine in the liquid phase at temperatures between about −5°C, and about 150°C. where molecular oxygen is the oxidant and a cupric ion-nitrogen base complex is the catalyst.

4 Claims, No Drawings

PROCESS FOR THE PREPARATION OF BENZONITRILE

This is a continuation of application Ser. No. 92,165 filed Nov. 23, 1970, now U.S. Pat. No. 3,719,701.

BACKGROUND OF THE INVENTION

Polymers derived from unsaturated nitrile monomers, such as acrylonitrile, methacrylonitrile, vinylidene cyanide, etc., are well known in the art. Of this class of monomers, acrylonitrile is presently the most important and is used in making a variety of commercial products, e.g., butadiene-acrylonitrile copolymer rubbers and acrylic textile fibers.

British Pat. No. 570,835 granted to Shell Development Company on July 25, 1945, describes a process for the production of unsaturated nitriles from the corresponding unsaturated amines by reacting the amines with oxygen in the presence of a silver oxidation catalyst at a temperature of at least 450°C. The process is essentially a vapor phase reaction in which a mixture of the amine vapor, oxygen and an inert carrier gas are passed over a metal-alloy catalyst bed at about 500°C. This process has the disadvantages of requiring expensive and complex equipment and high temperatures.

An object of the present invention is to provide a simple, straightforward and economical process for the preparation of benzonitrile.

Another object of the invention is to provide a process for the preparation of benzonitrile in high yields and substantially free of undesirable by-products.

Still another object of the invention is to provide a process of the type described in the two preceding paragraphs which may be carried out continuously.

Other objects and advantages of the invention will become apparent from the following detailed description thereof.

SUMMARY OF THE INVENTION

The foregoing objects are accomplished by the process of the present invention which comprises the catalytic oxidation of benzylamine to benzonitrile in the liquid phase at temperatures between about −5°C. and about 150°C. The process comprises forming a reaction mixture comprising a catalyst consisting of a cupric ion/nitrogen base complex and benzylamine dissolved in a mutual solvent for benzylamine and said catalyst, and molecular oxygen. The order of addition of the components of the reaction mixture is not critical. The overall reaction may be represented as follows: benzylamine + $O_2$ $\xrightarrow{catalyst}$ benzonitrile + $2H_2O$.

One theory for the mechanism of the reaction is that the cupric ion of the catalyst oxidizes the amine to form the corresponding unsaturated nitrile, whereby the complex is destroyed and the cupric ion is reduced to a cuprous ion or cuprous salt. In the presence of molecular oxygen the cuprous ion or salt is oxidized to a cupric ion, the catalyst (cupric ion/nitrogen base complex) is regenerated and the mechanism repeats.

Benzylamine may be prepared by well known procedures described in the literature, e.g., by reacting the benzyl halide, preferably the chloride or bromide with ammonia.

In carrying out the process defined herein the benzylamine must not contain substituent groups which either are oxidizable or inactivate the catalyst under the process conditions. In this context oxidizable groups are primary or secondary amine groups, phenoxy, ethynyl and hydrosulfide groups and groups which inactivate the catalyst are acid groups, such as carboxy and sulfo groups.

CATALYST

The catalyst consists of a cupric ion/nitrogen base complex. The catalyst system is preferably obtained by the oxidation of a cuprous salt in the presence of a nitrogen base.

Any cuprous salt may be used which forms a complex with the nitrogen base, is soluble in the reaction medium, and is capable of existing in the cupric state. Typical examples of such cuprous salts are cuprous chloride, cuprous bromide, cuprous sulfate, cuprous acetate, cuprous benzoate and the like. Among these, cuprous chloride is preferred, although the particular salt used in forming the complex has no effect on the product obtained.

The term nitrogen base is used herein to designate organic nitrogen compounds containing a nitrogen atom having an unshared pair of electrons which can combine with a proton, i.e., the usual designation of the term. All nitrogen bases which are not oxidized by cupric ions may be used. Suitable such nitrogen bases will be apparent to those skilled in the art and include amides such as: phosphoramides, carbonamides and sulfonamides, aliphatic and aromatic tertiary amines, cyclic tertiary amines. Specific examples of these compounds include hexamethylphosphoramide, N,N-dimethylacetamide, N,N-dimethylformamide, N,N-dimethylpropionamide, N,N-diethylacetamide, N-methylpyrrolidone, N-ethylpyrrolidone, triethylamine, tributylamine, diethylmethylamine, n-alkylpiperidines, quinolines, isoquinolines, N-alkyl morpholines and pyridine. Of these nitrogen bases pyridine, N,N-dimethylacetamide and hexamethylphosphoramide are generally preferred. Mixtures of two or more of the nitrogen bases may be used for carrying out the process.

The nitrogen bases are preferably used as the solvent for the catalyst and amine reactant. However, if desired, the nitrogen bases may be used in combination with compounds which only function as the reaction medium, e.g., inert solvents for the catalyst and amine reactant which do not interfere with the catalyst and are not oxidized to any appreciable extent thereby.

The catalyst system or cupric ion/nitrogen base complex is easily prepared by dissolving the cuprous salt, (e.g., cuprous chloride) in the nitrogen base, (e.g., pyridine) or mixture of bases and in the presence of an inert solvent, if desired, and then forming the complex in situ by treatment of the solution with molecular oxygen.

MODE OF OPERATION

The process is carried out in the liquid phase at temperatures ranging from between about −5° and about 150°C., and preferably from between 0°C. and 100°C. and at atmospheric or superatmospheric pressures. The process may be carried out either as a continuous process or as a batch process.

In a preferred mode of operation, molecular oxygen is used as the primary oxidant and may be introduced into the reaction medium by diffusion or injection techniques. Pure oxygen may be used, or alternatively, air or other gases containing free oxygen may be used as the oxidant. To obtain optimum yields of benzonitrile, a molar ratio of oxygen to benzylamine of at least one is used and, preferably, a molar excess of oxygen to benzylamine is used. However, higher or lower ratios may be used, if desired, since unreacted benzylamine can be recovered and, thus, the yield of nitrile is substantially unaffected by using an excess of benzylamine to oxygen.

When the batch process is used, the catalyst system may be prepared as indicated above, preferably at room temperature, and the benzylamine is added thereto under an atmosphere of oxygen with stirring for a period of time sufficient to assure complete reaction. In this respect, a gas chromatograph has been found to be an excellent means for following the progress of the reaction. After completion, the benzonitrile may be separated from the reaction mixture by distillation and the reaction repeated after reactivation of the catalyst by treatment with oxygen.

Alternatively, the catalyst prepared in the manner previously described is added to a chilled solution of the unsaturated amine in an appropriate reaction medium, (e.g., the nitrogen base used to prepare the catalyst) and then oxygen is added to the reaction medium until approximately the theoretical volume thereof has been consumed. This can be measured with great accuracy by using a closed system and a gas buret.

When the continuous process is used, it is preferable that the cupric ion/nitrogen base complex be prepared (with or without an inert solvent) and the benzylamine added thereto. The benzylamine is added at a slow rate to the reaction mixture while simultaneously passing a stream of air, other oxidant gas mixture or molecular oxygen through the solution at a temperature and flow rate such that optimum reaction conditions are established with respect to benzonitrile formation and the removal thereof from the reaction mixture by the gas sweep. The product is then removed from the exit gas stream by any well known method. The water formed as a result of the oxidation reaction may be removed from the benzonitrile by any suitable means such as by fractionation or the use of drying agents.

In actual operation, the optimum reaction conditions to be used in carrying out the process will depend on the reactants used, the oxidant vapor, and whether the continuous or batch method is employed. The optimum conditions for a given specific reaction and method can be readily determined by a few preliminary experiments.

To further illustrate the invention the following examples are given:

EXAMPLE I

Preparation of Acrylonitrile

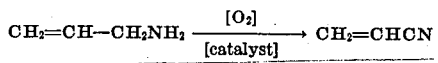

Cuprous chloride (0.25 g, 0.0025 mole) was oxidized with 14 ml of oxygen in 10 ml of pyridine at ambient temperature. Then, 0.143 g (0.0025 mole) of allyl amine was added and the reaction mixture was stirred under an oxygen atmosphere for 1 hour at 25°C. and then for 2 hours at 55°C. By quantitative gas chromatography, the yield of acrylonitrile was determined to be 43.8 percent.

EXAMPLE II

Preparation of Benzonitrile

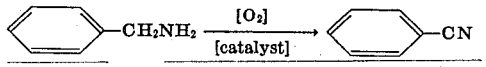

Cuprous chloride (0.25 g, 0.0025 mole) was slurried in 10 ml of dimethylacetamide under a nitrogen atmosphere. Then, 0.268 g (0.0025 mole) of benzylamine was added and the reaction mixture was stirred for 4 hours and 50 minutes under an oxygen atmosphere at temperatures from 66°C. to 90°C. A 70 percent yield of benzonitrile was obtained.

The foregoing examples illustrate the preparation of several commercially important unsaturated nitriles. Those skilled in the art will recognize however that the process has broad applications for the preparation of a wide variety of unsaturated nitriles. A major advantage of the process defined herein is that the nitrile products obtained are usually free of undesirable by-products and may be purified by simple distillation.

I claim:

1. A liquid phase process for the preparation of benzonitrile by the catalytic oxidation of benzylamine comprising reacting at a temperature between −5° and 150°C. benzylamine and molecular oxygen in a solvent in the presence of cuprous ions and cupric ions, wherein said ions are formed by adding to said solvent in the presence of molecular oxygen a cuprous salt selected from the group consisting cuprous chloride, cuprous bromide, cuprous sulfate, cuprous acetate, cuprous benzoate and mixtures thereof, said solvent being selected from the group selected from hexamethylphosphoramide, N,N-dimethylacetamide, N,N-dimethylformamide, N,N-dimethylpropionamide, N,N-diethylacetamide, N-methylpyrrolidone, N-ethylpyrrolidone, triethylamine, tributylamine, diethylmethylamine, N-alkylpiperidine, quinoline, N-alkylmorpholine, pyridine and mixtures thereof.

2. The process of claim 1 wherein said cuprous salt is cuprous chloride.

3. The process of claim 2, wherein said solvent is pyridine.

4. The process of claim 2, wherein said solvent is N,N-dimethylactamide.

* * * * *